(12) United States Patent
Vatteroni

(10) Patent No.: US 9,918,026 B2
(45) Date of Patent: Mar. 13, 2018

(54) PHOTO-DETECTOR DEVICE FOR ELECTRO-OPTICAL SENSORS WITH VARIABLE LIGHT DYNAMICS

(71) Applicant: Monica Vatteroni, Trento (IT)

(72) Inventor: Monica Vatteroni, Trento (IT)

(73) Assignee: EYE-TECH SRL (IT)

( * ) Notice: Subject to any disclaimer, the term of this patent is extended or adjusted under 35 U.S.C. 154(b) by 930 days.

(21) Appl. No.: 14/348,142

(22) PCT Filed: Sep. 27, 2012

(86) PCT No.: PCT/IB2012/001904
§ 371 (c)(1),
(2) Date: Mar. 28, 2014

(87) PCT Pub. No.: WO2013/046003
PCT Pub. Date: Apr. 4, 2013

(65) Prior Publication Data
US 2014/0204189 A1 Jul. 24, 2014

(30) Foreign Application Priority Data

Sep. 29, 2011 (IT) .............................. UD2011A0149

(51) Int. Cl.
*H04N 5/355* (2011.01)
*H04N 5/378* (2011.01)

(52) U.S. Cl.
CPC ........... *H04N 5/355* (2013.01); *H04N 5/3559* (2013.01); *H04N 5/378* (2013.01)

(58) Field of Classification Search
None
See application file for complete search history.

(56) References Cited

U.S. PATENT DOCUMENTS 6,204,524 B1 * 3/2001 Rhodes ............ H01L 27/14609
257/222
6,414,292 B1 * 7/2002 Afghahi ............ H01L 27/14609
250/208.1

(Continued)

FOREIGN PATENT DOCUMENTS

EP 0977426 2/2000
EP 1770985 4/2007

(Continued)

*Primary Examiner* — Obafemi Sosanya
(74) *Attorney, Agent, or Firm* — Johnson Legal PLLC

(57) ABSTRACT

Photo-detector device for electro-optical sensors, comprising at least a detection and conversion circuit, or pixel (20), having at least a photo-sensitive reception mean (26) and a reset control terminal (11), which is able to drive an element to control the charge dissipation (23) of the photo-sensitive reception mean (26). The pixel (20) is able to convert the current generated by the photo-sensitive reception mean (26) into a voltage signal on a read-out terminal (28). The photo-detector device also comprises a circuit for controlling the reset voltage (40), able to generate a suitable input signal to the reset control terminal (11) by connecting it alternatively to a reset terminal (42) or to an external reference terminal (47), the input signal to said external reference terminal (47) is the type that can be programmed from outside. Furthermore, the circuit for controlling the reset voltage (40) can be shared between a subset of detection and control circuits (20).

12 Claims, 4 Drawing Sheets

(56) References Cited

U.S. PATENT DOCUMENTS

| | | | |
|---|---|---|---|
| 2002/0113886 A1* | 8/2002 | Hynecek | H04N 3/155 348/302 |
| 2009/0026508 A1* | 1/2009 | Seitz | H01L 27/146 257/292 |
| 2010/0097508 A1* | 4/2010 | Yanagita | H01L 27/14603 348/301 |
| 2010/0157120 A1 | 6/2010 | Compton | |

FOREIGN PATENT DOCUMENTS

| WO | WO 2003/019829 | 3/2003 |
|---|---|---|
| WO | WO 2009/042901 | 4/2009 |

* cited by examiner

PHOTO-DETECTOR DEVICE FOR ELECTRO-OPTICAL SENSORS WITH VARIABLE LIGHT DYNAMICS

FIELD OF THE INVENTION

The present invention concerns a photo-detector device used in electro-optical sensors, suitable to detect an incident light and to convert it into a correlated electrical signal.

The photo-detector device according to the invention guarantees a high quality of the images both in conditions of low light and also when there is bright light, therefore with a light intensity varying in a wide range.

The present invention is used in particular, although not exclusively, to obtain electro-optical sensors to be inserted in digital cameras, digital video cameras, smart electro-optical sensors or in biomedical devices, in particular, but not only, in instruments for endoscopic investigations.

BACKGROUND OF THE INVENTION

Electro-optical sensors are known, comprising a plurality of photo-detector devices suitable to detect light signals by means of a photo-sensitive element, and to transmit them in the form of electrical signals to a calculator unit that processes them, obtaining images. The images are then transmitted to display devices which allow a user to see the images or information deriving from them.

Electro-optical sensors, generally based on silicon technology of the CMOS type (Complementary Metal Oxide Semiconductor), are able to offer a high quality image even in lighting conditions that vary greatly inside the same scene (see for example Seger, Graf, Landgraf—"Vision assistance in Scene with extreme contrast"—IEEE Micro, vol. 13 page 50, February 1993).

It is generally known that the quality of the images can be improved by compressing the signal on a logarithmic scale inside the photo-sensitive element. Solutions are known in which the compression is achieved by connecting to the photo-sensitive junction a MOS type transistor in a diode configuration, as described for example in U.S. Pat. No. 5,608,204.

One disadvantage of this type of electro-optical sensors is that, in the case of poor lighting, the definition of the image is not optimal.

A photo-sensitive element for electro-optical sensors is also known, from EP-A-1.770.985, developed to provide images with a high repetition frequency and high quality, both in cases of poor lighting and also when there is a high range of luminosity inside the same scene, that is, in so-called conditions of high light dynamics.

In the configuration proposed in EP-A-1.770,985, the photo-sensitive junction is polarized at a reference voltage value, called reset condition, set by the user, and then insulated at the start of the signal integration phase, acting on a digital type switch.

The photo-sensitive element proposed in EP-A-1.770,985 comprises a first linear output, of the conventional type, and a second output that allows to map information in the event of high luminosity. The functioning principle is based on the temporal mapping of the instant when the first output reaches the signal level beyond which it is no longer significant, called saturation level. To map this information correlated to the saturation level, a comparator is used which, at the instant of saturation, triggers a switch and freezes in a memory the current value of an external reference signal. This signal has a shape that can be programmed from the outside and is memorized on a capacitor. The signal is therefore used only as a temporal reference, exploiting the point-to-point correspondence between time and voltage.

One disadvantage of this photo-sensitive element is that it is complex, and requires a lot of space to be integrated on a silicon support or substrate, thus limiting the possibility of integration in a reduced space.

An alternative technique for obtaining a response with high light dynamics consists of returning the photo-sensitive junction to the reference voltage, called reset condition, during the integration time, every time the output of the photo-sensitive element reaches the saturation level, and of counting the event in a memory. One example of this kind of technique is found in WO2009/042901, where the total integration time is divided into intervals of different duration, programmable by the user. At the end of every interval, the output of the photo-sensitive element is controlled. If the output has reached the saturation level, the photo-sensitive junction is taken to the original reset status and the event is stored in a support memory; on the contrary, if the saturation level has not been reached, the integration is continued without modifying the status of the photo-sensitive element.

The main disadvantage of this technique is that it is necessary to associate with every photo-sensitive element a memory able to memorize the number of times that the photo-sensitive element has reached the saturation level, and a sophisticated digital control able to discriminate the need for a new reset of the photo-sensitive junction.

Among the various alternatives that exploit information contained inside the same scene there is also the known technique that uses a voltage generator for generating a plurality of reference voltages, in which the voltage generator is combined with a switch circuit for the selective opening/closing of the corresponding circuit. The selective activation of the switches allows to apply the voltage produced by the voltage generator to one and/or the other of plurality of pixels disposed in a matrix so as to selectively control the quantity of charge dissipated by the light falling on the photo-sensitive elements. The sequentiality of reference voltages generated is such as to expand the range of visible luminosity inside the same scene, irrespective of the value of capacities associated with the matrix of pixels.

Using this technique, which provides to use a single generator of reference voltages, has the disadvantage that it allows to polarize the pixels, or a subset of pixels of the matrix, exclusively at a voltage value common to the whole matrix and set by the reference voltage generator. Because of this, for example, it is not possible to manage the reset status of the individual pixel, or of a subset of selected pixels, independently of the status of the other pixels in the matrix. In fact, every single pixel can only be connected or disconnected to/from the single reference voltage by means of a system of switches, without any other possible configurations being provided. Consequently, the reset status of the pixels can only be managed overall with respect to the matrix or other arrangement that comprises them.

One purpose of the present invention is to obtain a photo-detector device for electro-optical sensors that can be integrated into a small-size silicon support element or substrate, achieving a microchip, and that is suitable to supply good quality images at high repetition frequency, both in cases of poor lighting and also when there is a wide range of visible luminosity inside the same scene.

Another purpose of the present invention is to obtain an electro-optical sensor that comprises a plurality of photo-detector devices in which pixels can be disposed according to a matrix, or in another desired disposition, and which allows to manage independently the reset status even of a single pixel, or a desired subset of pixels of the matrix, or other disposition, in order to improve the reading conditions thereof.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purposes, a photo-detector device according to the present invention comprises at least a detection and conversion circuit, or pixel, having a photo-sensitive reception mean such as for example an inversely polarized diode, at least a switch made with silicon technology used to control the polarization voltage of the reception mean, and a reset control terminal connected to the switch.

According to one characteristic of the present invention, the photo-detector device comprises a circuit for controlling the reset voltage alternatively able to restore a reset voltage or to apply to said reset control terminal a reference voltage such as to condition dynamically the quantity of charge dissipated by the incident light.

In a preferential form of embodiment, the circuit for controlling the reset voltage comprises a plurality of switches that are able, depending on control signals applied to at least a first external control terminal, to alternatively return to the reset control terminal of the pixel the signal applied to a reset terminal, or to a programmable external reference terminal.

According to a preferential form of embodiment of the invention, a photo-detector device comprises two or more pixels having the reset control terminal in common and connected to the said circuit for controlling the reset voltage.

The pixels of the same photo-detector device can be disposed adjacent to each other in rows or columns, or in contiguous groups in a desired disposition.

In one form of embodiment of the invention, in this case, contiguous groups of pixels are associated with their own, distinct circuit for controlling the reset voltage, so that each group of pixels can be managed with a reset voltage value independent of the adjacent group of pixels.

The present invention also concerns an electro-optical sensor comprising a silicon substrate on which a plurality of photo-detector devices are made, each comprising one or more pixels, so as to define a group of pixels, and a corresponding circuit for controlling the reset voltage. The electro-optical sensor also comprises command means, which are connected to the circuits for controlling the reset voltage of the photo-detector devices that make up the sensor, and allow to manage the status of each of said photo-detector devices independently. The possibility of controlling the photo-detector devices and/or the individual pixels independently, or for independent groups, allows a flexible use of the electro-optical sensor according to applicational requirements and to the range of visible luminosity inside the same scene.

The disposition of the individual photo-detector devices in a sensor is such that the pixels of different photo-detector devices form matrix or aligned conformations, in desired dispositions, in rows and/or columns.

According to another characteristic of the present invention, the switches of the circuit for controlling the reset voltage are made with transistors using CMOS technology.

According to another characteristic of the present invention, to obtain an output signal conditioned by the shape of the signal applied to the reset terminal, an external reference signal is used which has a variable and programmable configuration.

Using an external and programmable reference signal allows to detail, in a diversified manner, according to the type of processing to be done with the image and according to applicational requirements, the range of visible luminosity inside the same scene and the type of compression applied to it.

According to a variant of the present invention, a reset transistor of the pixel can be polarized so as to be kept in a diode configuration, setting the gate voltage always equal to its drain voltage. In this case the pixel reader terminal will return a signal that will be the result of a logarithmic compression.

The programmable reference signal allows to obtain information connected to signals that exceed the linear dynamics according to the state of the art. The programmability of the reference signal thus guarantees the possibility of obtaining different compressions for various lighting zones of the same scene, depending on needs connected to the type of application.

Advantageously, the reference signal is the voltage ramp type, for example the linear dash type over several consecutive time intervals.

Alternatively, the reference signal can be a step-type signal of voltage, and therefore can assume different discreet values at different time intervals, until it covers the whole time interval available for the acquisition of the signal, guaranteeing in this case too an extension to the range of visible luminosity inside the same scene.

According to the present invention, the reference signal can have one of the developments as described above, or can have a combination of the types described above. In all cases, the signal generated by the photo-sensitive reception mean advantageously has a sufficiently high value to allow an efficient processing of the signal, and good immunity with respect to the electrical noises generated by the other components on the support, advantageously a microchip, of the photo-detector device.

By combining the photo-detector device with a suitable circuit to analyze the image obtained, it is also possible to obtain an adaptive circuit in which the response curve of the photo-sensitive reception mean is optimized as a function of the distribution of the light intensity on the scene examined.

The circuit described has the following advantages:
  it is able to detect the light, or luminous radiation, in an range of intensity that varies depending on requirements, up to more than 120 dB, inside a single scene or image;
  it guarantees flexibility in piloting, analogous to that of a traditional pixel with linear dynamics;
  it provides a good quality of the images even when there is poor light at input and therefore low current generated by the photo-sensitive reception mean;
  it allows to analyze zones with different scene or image luminosity, with programmable accuracy;
  the photo-sensitive element can be integrated into a silicon-based structure, or microchip, with a bulk such that it can be advantageously used in the industrial field.

DESCRIPTION OF THE DRAWINGS

These and other characteristics of the present invention will become apparent from the following description of a preferential form of embodiment, given as a non-restrictive example with reference to the attached drawings wherein.

DETAILED DESCRIPTION OF SOME PREFERENTIAL FORMS OF EMBODIMENT

Figure 1:
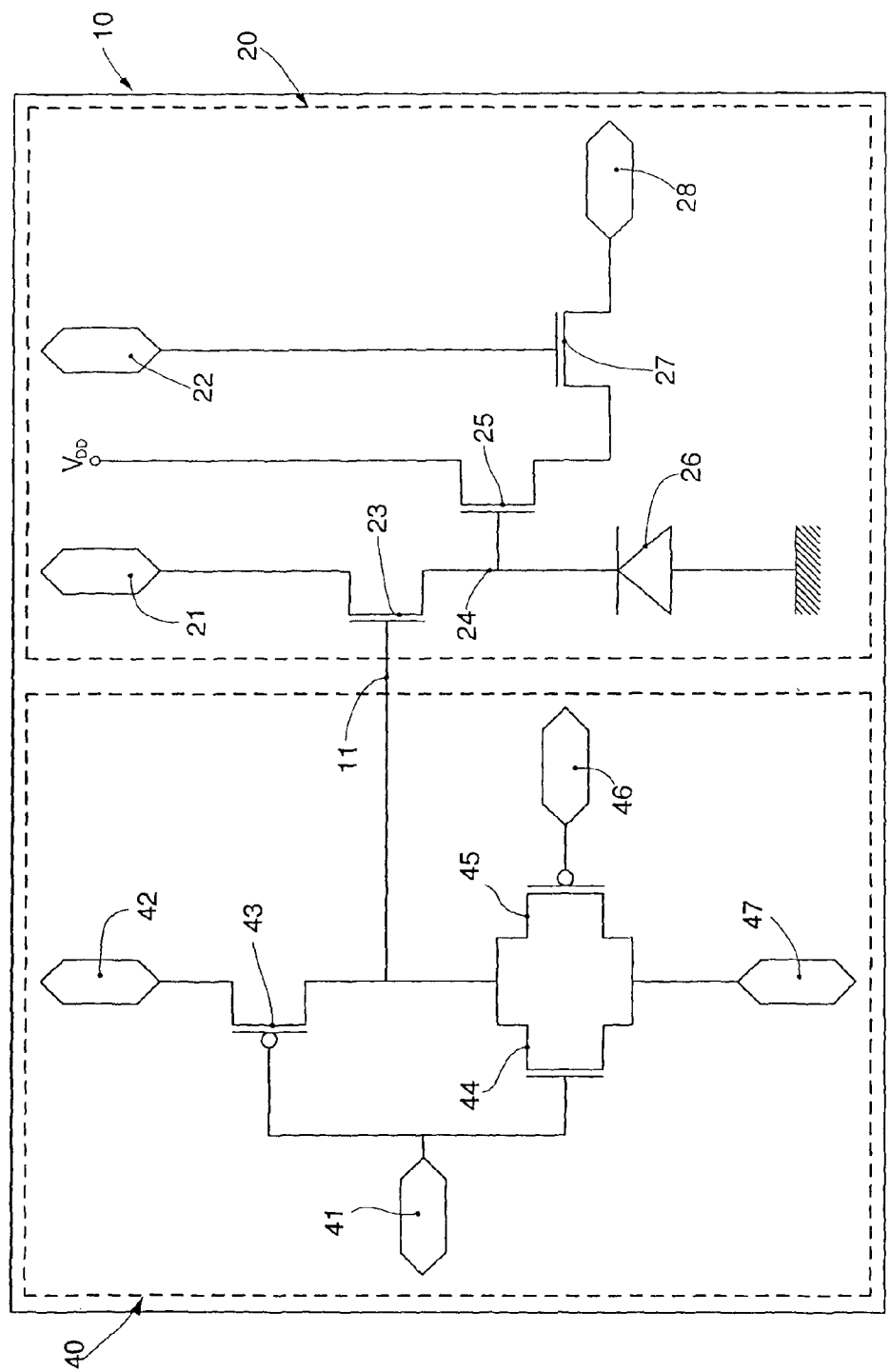
FIG. 1 shows an electrical diagram of a photo-sensitive element according to the present invention.

With reference to FIG. 1, a photo-detector device 10 according to the present invention comprises, in the form of embodiment shown as an example in FIG. 1:
- a detection and conversion circuit 20 of the luminous signal or pixel, having an inversely polarized diode 26, sensitive to light;
- an element to control the charge dissipation 23, which in this case is a MOS transistor polarized by a signal applied to an external polarization terminal 21, driven to the gate by means of a reset control signal applied to an internal reset control terminal 11;
- an active amplification element 25 and
- a first switch 27 in semiconductor technology driven by a signal applied to the external selection terminal 22 that carries the output signal on a read-out terminal 28.

The active amplification element 25 and the first switch 27 are made with MOS type transistors.

The photo-detector device 10 also comprises a circuit for controlling the reset voltage 40 having a second switch 43 and a third switch 44 in semiconductor technology driven by a signal applied to a first external control terminal 41 and a fourth switch 45 in semiconductor technology driven by a signal applied to a second external control terminal 46. The external signals applied to the external control terminals 41 and 46 are such as to return alternatively a signal applied to a reset terminal 42 and a signal applied to a programmable external reference terminal 47 to the reset control terminal 11, that is to the entrance of the pixel 20.

Figure 2:
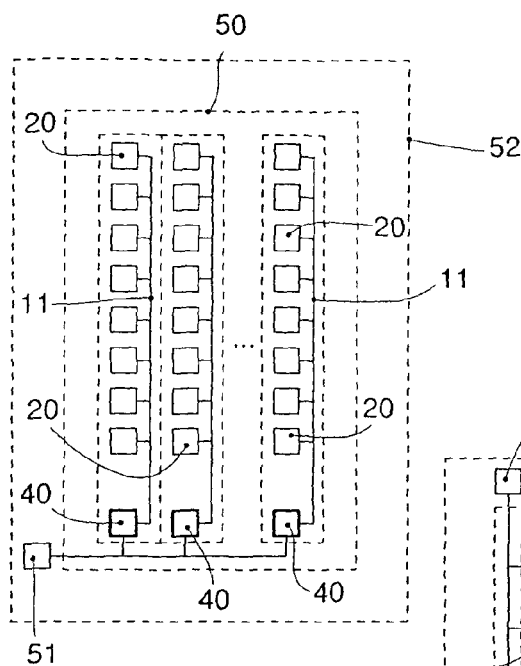
FIGS. 2, 3 and 4 show some configurations in which a plurality of photo-detector devices form a matrix.
Figure 3:
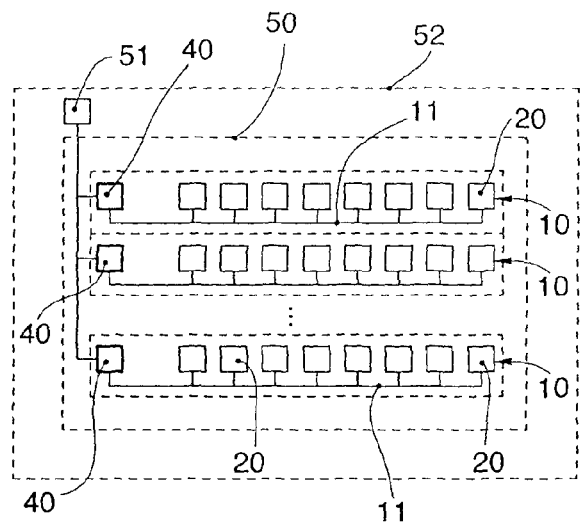

The photo-detector device 10 in FIG. 1 is shown by way of example with a single pixel 20; according to an advantageous form of embodiment of the present invention, a photo-detector device 10 may comprise a plurality of pixels 20 (FIGS. 2, 3 and 4), defining for example contiguous groups of pixels 20 independent with respect to each other, which have their respective reset control terminals 11 connected to each other and to the circuit for controlling the reset voltage 40.

Figure 4:
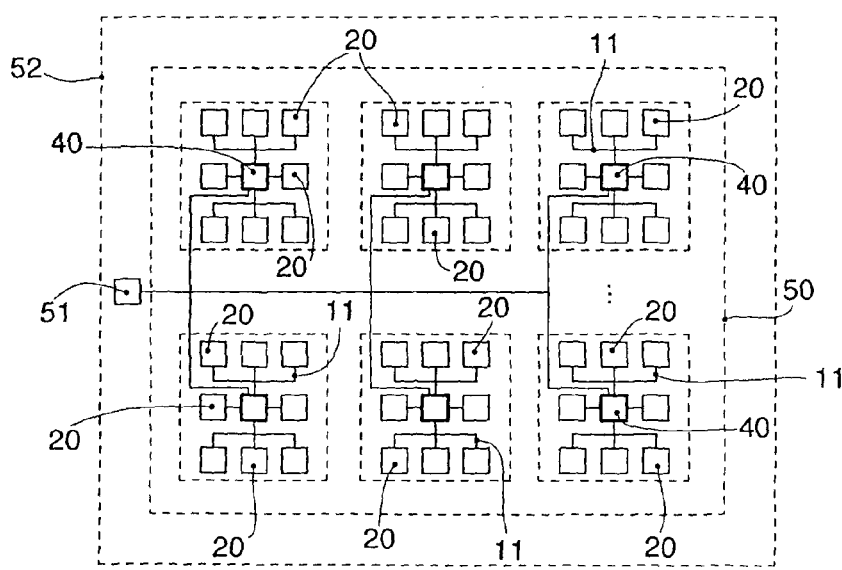

As shown in the drawings, a plurality of photo-detector devices 10 can be made on an electro-optical sensor 52, in which the relative pixels 20 form a matrix 50. The pixels 20 of an individual photo-detector device 10 can be disposed in the matrix 50 in columns (FIG. 2), in rows (FIG. 3) or in desired groups (FIG. 4). The electro-optical sensor 52 according to the present invention also comprises driving means 51 which are connected to the circuit for controlling the reset voltage 40 of the photo-detector devices 10.

Advantageously, therefore, the status of the pixels 20 relating to different photo-detector devices 10 can be independently controlled by means of the respective circuits for controlling the reset voltage 40, hence in individual groups, thus making the management of the electro-optical sensor 52 extremely flexible.

With reference to FIG. 1, the pixel 20 is of the type suitable to detect the light with wavelengths belonging to the visible spectrum and beyond, and with an intensity varying in a range of at least 6 decades, between $10^{-3}$ and $10^3$ W/m².

The diode 26 comprises a medium-doped N-type insulated junction, which can be made by means of a well where the dopant is localized, called Nwell, or heavily doped, made by means of an N+ diffusion on a P-type substrate. The interface region between the two differently doped zones of the diode 26 is emptied of free charges, due to the presence of an internal electrical field which can be increased by inversely polarizing the diode.

To this purpose, in the structure a ground contact is put in the substrate while the N-type diffusion zone, that is, the terminal of the cathode, is connected to a suitable control signal depending on the status of the signal applied to the reset control terminal 11 at entrance to the charge dissipation control element 23.

The substrate P, that is, the anode of the diode 26, which is in common with the N channel transistor and is weakly doped, is polarized to ground.

According to the present invention, the switches 27, 43, 44 and 45 of the photo-detector device 10 are made in CMOS technology in structures that can have a single P or N transistor, or more complex structures.

The charge dissipation control element 23 allows to vary the condition of the diode 26 depending on the status of the signal applied to the reset control terminal 11 between a reset status and an integration status or vice versa.

The first switch 27 is driven from outside the pixel 20 with the signal applied to the external selection terminal 22 and, depending on its status, a photo-sensitive node 24 is kept insulated, or connected to encoding and reading circuits downstream of the reading terminal 28.

According to one characteristic of the present invention, the second 43, the third 44 and the fourth switch 45 are used to control the signal applied to the reset control terminal 11, connecting the latter to the reset terminal 42 by means of the second switch 43 when the diode 26 is to be taken to the reset status, and to the programmable external reference terminal 47, by means of the switches 44 or 45, when the diode 26 is to be taken to the integration status. In this way, the signal applied to the programmable external reference terminal 47 can be used by several photo-detector devices 10 at the same time, while the signal applied to the reset terminal 42 can be managed independently for every pixel 20, or a subset of pixels that form a group, connecting the reset terminal 42 to the reset control terminal 11 independently.

In this way, distinct groups of pixels 20, for example a row, a set of rows, a column, a set of columns, or different combinations of pixels, can form groups managed independently, each one associated with its own circuit for controlling the reset voltage 40, so as to allow a differentiated and autonomous management thereof, according to specific requirements.

The external reference signal applied to the programmable external reference terminal 47 is a reference that can be programmed by the user, according to the application and requirements. In a preferential form of embodiment of the present invention, the external reference signal is a linear dash signal.

By combining this circuit with a programmable reference signal with a suitable circuit to analyze the image thus obtained, it is possible to obtain a so-called "adaptive" circuit, that is, a circuit in which the response curve of the diode 26 is optimized as a function of the distribution of the light intensity on the scene examined.

Figure 5:
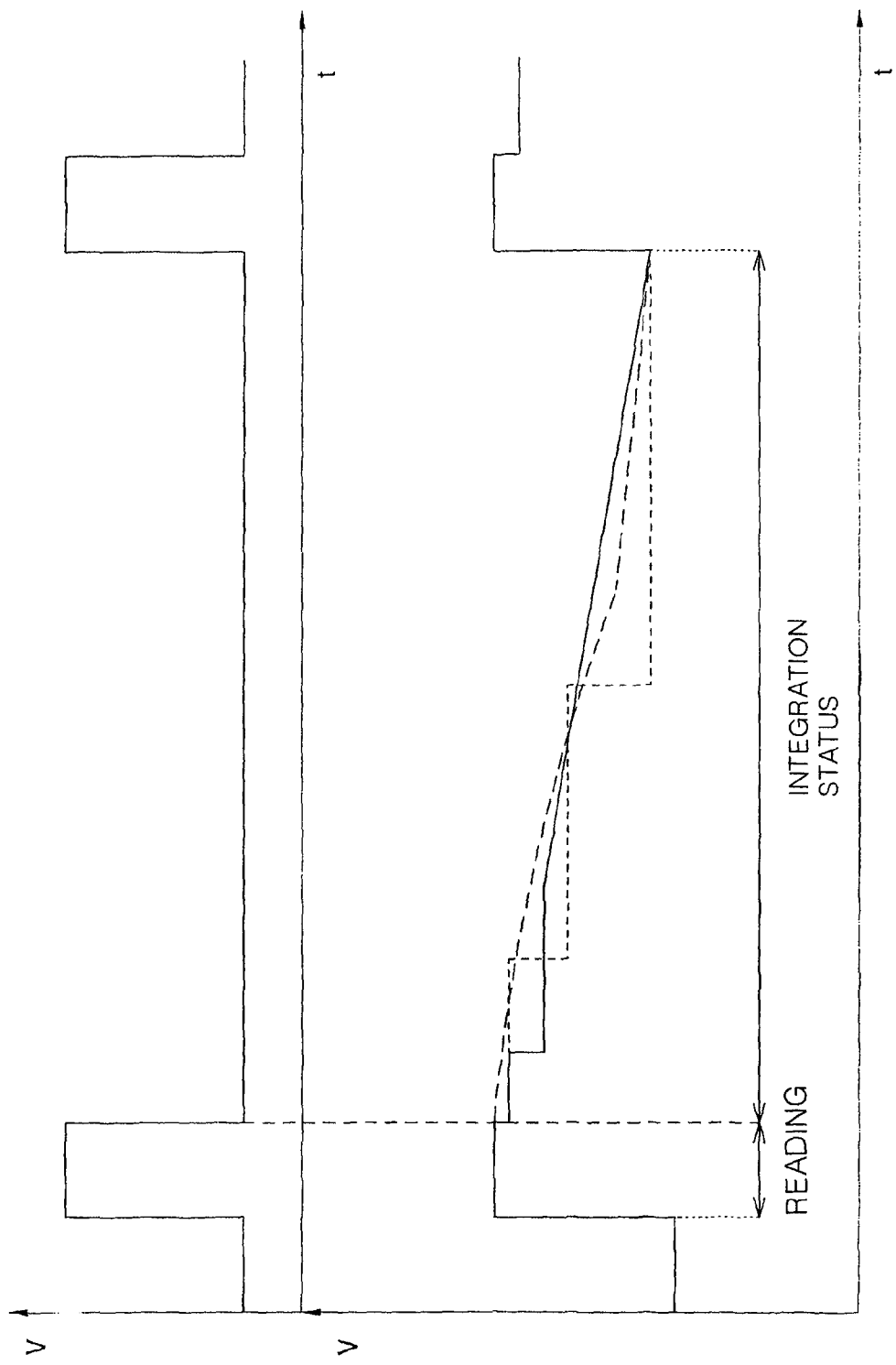
FIG. 5 shows the graph of the development of some programmable reference signals.

According to the shape of the external reference signal, a different output will be obtained on the reading terminal 28. Depending on specific requirements, the programmable external reference signal 47 can be a linear dash signal, a monotone ramp, a step type signal of voltage or a combination thereof, as shown in the examples of programming curves in FIG. 5.

According to another form of embodiment of the present invention, if used in an environment with controlled light, the control signal 47 can be synchronized with lighting pulses so that the light is present in the integration status and absent during the reading of the pixels 20. If the photo-detector devices 10 are organized in a matrix 50 (FIGS. 2, 3 and 4), the light will remain off during the reading of all the pixels 20 and, during this interval of time, the signal applied to the reset terminals 42 will be activated independently for each group of pixels 20 of the same photo-detector device 10, while the light will remain on during the integration status when all the pixels 20 share the external reference signal.

Figure 6:
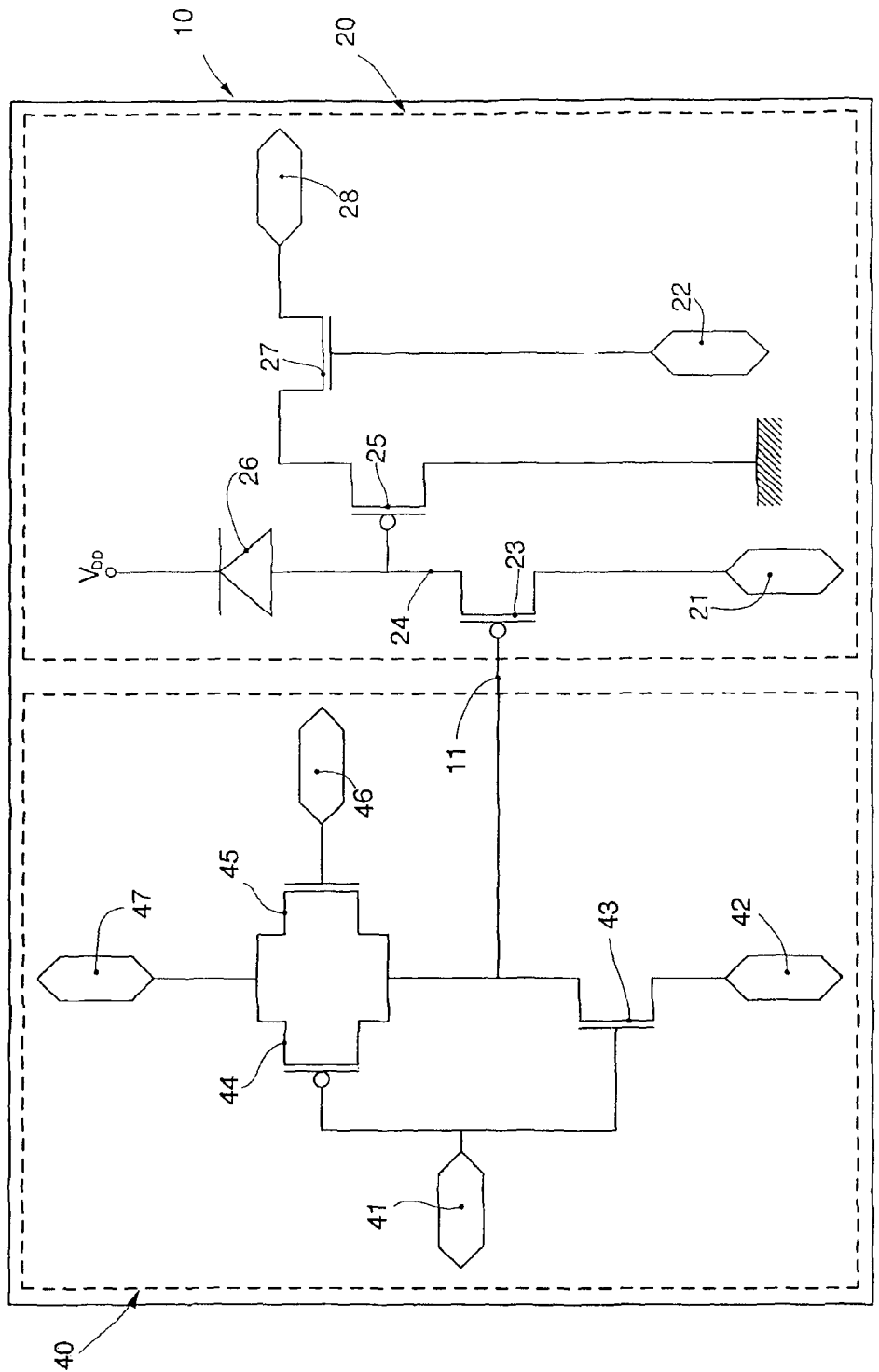
FIG. 6 shows a variant of the electrical diagram in FIG. 1.

FIG. 6 shows a variant form of embodiment of the photo-detector device 10, complementary to that in FIG. 1. According to this variant, the polarity of the diode is inverted, all the N-type transistors are replaced by P-type transistors and vice versa, while the ground and feed terminals are inverted with respect to each other. This configuration is very similar in functioning to the circuit described previously with reference to FIG. 1.

It is clear that modifications and/or additions of parts may be made to the photo-detector device 10 as described heretofore, without departing from the field and scope of the present invention.

It is also clear that, although the present invention has been described with reference to some specific examples, a person of skill in the art shall certainly be able to achieve many other equivalent forms of photo-detector devices 10, having the characteristics as set forth in the claims and hence all coming within the field of protection defined thereby.

The invention claimed is:

1. Photo-detector device for electro-optical sensors, comprising at least a detection and conversion circuit, or pixel (20), having at least a photo-sensitive receiver (26) and a reset control terminal (11), which is able to drive an element to control the charge dissipation (23) of said photo-sensitive receiver (26), said detection and conversion circuit, or pixel (20), being able to convert the current generated by said photo-sensitive reception mean (26) into a voltage signal available on a read-out terminal (28), characterized in that
said photo-detector device also comprises a circuit that controls the reset voltage (40) and is able to generate an input signal to said reset control terminal (11) by connecting said reset control terminal (11) alternatively to a reset terminal (42) or an external reference terminal (47), and
further characterized in that said input signal to said external reference terminal (47) is the type that can be programmed from outside and used to condition dynamically the quantity of charge dissipated by the incident light.

2. Detector device as in claim 1, characterized in that it comprises a plurality of detection and conversion circuits, or pixels (20), disposed adjacent with respect to each other in rows or columns, or according to a desired disposition in groups, wherein a plurality of detection and conversion circuits (20) forming a group share their own circuit for controlling the reset voltage (40), different from the circuit for controlling the reset voltage (40) of another plurality of detection and conversion circuits (20) forming another group.

3. Device as in claim 2, characterized in that said circuit for controlling the reset voltage (40) is connected to the reset control terminal (11) of each of said pixels (20).

4. Device as in claim 1, characterized in that said circuit for controlling the reset voltage (40) comprises a first control terminal (41) and a second control terminal (46) that, on the basis of appropriate signals, are suitable to selectively drive the connection of said reset control terminal (11) to said reset terminal (42) or to said external reference terminal (47).

5. Device as in claim 1, characterized in that, in the case of controlled light environment, the signal of said external reference terminal (47) is suitable to be synchronized with the illumination pulses so that the light is present during an integration status of said detection and conversion circuit (20) and absent during the read-out by the read-out terminal (28).

6. Device as in claim 1, characterized in that said signal of said external reference terminal (47) of the programmable type is configured to allow the compression of the signal detected on said read-out terminal (28) and has a variable shape at least depending on the light intensity detected by said photo-sensitive reception mean (26).

7. Device as in claim 6, characterized in that said signal of said programmable external reference terminal (47) is a voltage ramp type signal.

8. Device as in claim 7, characterized in that said voltage ramp is a linear dash type.

9. Device as in claim 6, characterized in that said signal of said programmable external reference terminal (47) is a step type signal of voltage.

10. Electro-optical sensor comprising a silicon substrate and a plurality of photo-detector devices (10) as in claim 1, made over said substrate, characterized in that it also comprises driving means (51) which are connected to the circuits for controlling the reset voltage (40) of the photo-detector devices (10) and are suitable to independently drive the status of each of said photo-detector devices (10).

11. Electro-optical sensor as in claim 10, characterized in that the disposition of said photo-detector devices (10) is such that said pixels (20) are disposed in a matrix (50).

12. Electro-optical sensor as in claim 10, characterized in that each of said photo-detector devices (10) is associated to a circuit to analyze the image obtained in order to achieve an adaptive circuit in which the response curve of said photo-sensitive reception mean (26) is optimized as a function of the distribution of the light intensity on the scene examined.

* * * * *